UNITED STATES PATENT OFFICE.

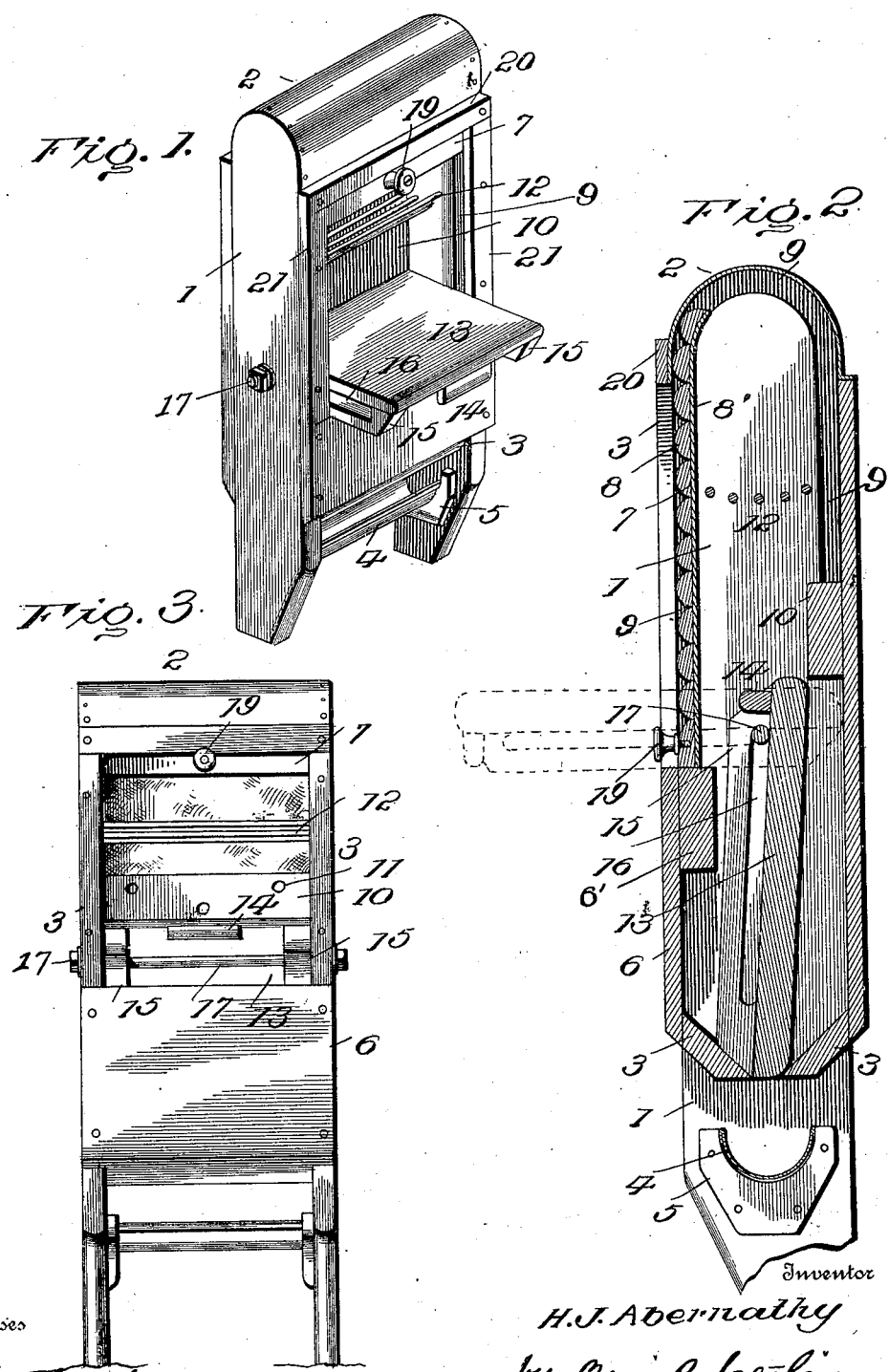

HENRY J. ABERNATHY, OF SOCORRO, TERRITORY OF NEW MEXICO, ASSIGNOR OF ONE-HALF TO HERSCHEL L. MAYBERY, OF PATTERSON, TERRITORY OF NEW MEXICO.

BREAD-BOARD AND HOLDER.

SPECIFICATION forming part of Letters Patent No. 629,416, dated July 25, 1899.

Application filed April 10, 1899. Serial No. 712,487. (No model.)

*To all whom it may concern:*

Be it known that I, HENRY J. ABERNATHY, a resident of Socorro, in the county of Socorro and Territory of New Mexico, have invented certain new and useful Improvements in Bread-Boards and Holders; and I do hereby declare the following to be a full, clear, and exact description of the invention, such as will enable others skilled in the art to which it pertains to make and use the same.

The invention relates to bread and pastry boards and supporting-holders therefor, and has for its object to improve devices of such nature.

The invention consists in the construction hereinafter described and pointed out.

In the accompanying drawings, Figure 1 is a perspective of the improved holder and board. Fig. 2 is a vertical central section on an enlarged scale, and Fig. 3 is a front elevation.

Numeral 1 denotes the side pieces of the holder or inclosing frame, connected at their upper ends by a cover 2 and joined by cross-pieces 3 a short distance above their lower ends. Said cross-pieces are arranged, as shown, to constitute a chute to guide falling flour, dough fragments, or other refuse material into a removable receptacle 4, which is supported upon brackets 5. The holder is closed in the rear above the chute, as represented, and partially closed in front by a board 6.

6' is a cross-bar contiguous the front board 6. Its upper front is closed by a curtain 7, consisting in the present instance of slats 8, fastened to a cloth 8' or other flexible backing.

9 9 denote grooves in the side pieces of the holder and extending from the front inclosing board 6 to a cross-bar 10, situated in the back part of the holder. This bar acts as a stop for the curtain when raised in front and lowered behind, as required when the holder is opened for the use of the bread-board. When closed, the curtain is stopped in front by the bar 6'.

11 denotes screw-holes to receive screws for fastening the holder to a wall or other support.

12 denotes a rack or shelf adapted to hold a rolling-pin, cutter, and other articles.

The bread-board is indicated by 13, and 14 denotes a handle therefor. 15 are cleats secured to the ends of this board to strengthen the same. They are cut away at 16 to provide slots to receive a rod 17, fixed in the side pieces of the holder. The slots may be formed entirely in the cleats. When not in use, the board is hung upon this rod by means of its cleats, and it is of such length that at such time its lower edge closes the discharge-opening between the inclined cross-pieces 3. The rod is removable to permit removal of the board for washing, drying, or sunning. The board is moved to an operative situation by means of its handle 14. To effect this, the board is raised and turned about the rod until its rear part is stopped by the bar 10. The board then rests directly on the rod and by its cleats upon the front board 6.

The front end of the curtain in its open situation is stopped by its knot 19 engaging the strip 20, which may be used to cover the lower edge of the cover 2, which latter may conveniently be made of sheet metal bent to the form shown and tacked to the upper ends of the side pieces.

The side strips 21 finish the front of the holder and in part inclose the curtain-grooves.

It will be understood that when not in use the board is inclosed by the curtain and holder, which exclude flies and dust. The board at such time also closes the discharge-opening, as before stated. Implements placed on the rack and the entire interior of the frame are also protected.

The holder can be detachably secured to any suitable support, and the board can be easily and quickly moved to an operative situation, when it is firmly supported.

If desired, the side pieces of the holder can be made to rest on a shelf, floor, or other support, and obviously their length can be varied, as also can be the dimensions of the whole structure and of its various parts. A holder six inches in depth has been found very suitable.

It will be readily understood that the improved board and holder will not require the use of a table and that such article will be left free for other uses. Flour or other material cannot be accidentally thrown from the board while in use except in front, which of course can be easily guarded. Materials adhering to the board can be easily loosened and deposited in the receptacle 4 without danger of being thrown on the floor, as in brushing such material from a board or table.

Having thus described my invention, what I claim is—

1. A bread-board holder having a discharge-opening at its lower end, and a bread-board movably supported within said holder, said board when in inoperative situation being adapted to entirely close the discharge-opening.

2. A bread-board holder having an opening in its front portion a movable closure for said opening, a bread-board supported within the holder, and a cross-bar secured to the holder and serving as a limit for the movement of the closure in one direction and as a stop for the bread-board in operative situation.

3. A bread-board holder having a discharge-opening at its lower end, a bread-board adapted to close said opening when in an inoperative situation, brackets secured to the holder beneath the discharge-opening, and a receptacle loosely supported on said brackets, substantially as described.

In testimony whereof I have signed this specification in the presence of two subscribing witnesses.

HENRY J. ABERNATHY.

Witnesses:
ALFRED E. HOWELL,
EMERSON L. SMART.